United States Patent [19]

Yoon et al.

[11] Patent Number: 4,609,536
[45] Date of Patent: Sep. 2, 1986

[54] METHOD FOR PRODUCING REACTIVE LIME AND REDUCING SULFUR DIOXIDE

[75] Inventors: Heeyoung Yoon, McMurray; Francis P. Burke, Bethel Park, both of Pa.

[73] Assignee: Conoco Inc., Wilmington, Del.

[21] Appl. No.: 714,754

[22] Filed: Mar. 22, 1985

[51] Int. Cl.$^4$ .......................... B01J 8/00; C01B 17/00; C01B 13/14; C01F 5/02
[52] U.S. Cl. ..................................... 423/244; 423/637
[58] Field of Search ............... 423/242 A, 244 A, 637, 423/242 R, 244 R; 422/62

[56] References Cited

U.S. PATENT DOCUMENTS

| | | | |
|---|---|---|---|
| 3,998,928 | 12/1976 | Stendel et al. | 423/636 |
| 4,185,080 | 1/1980 | Rechmeier | 423/242 |
| 4,309,393 | 1/1982 | Nguyen | 423/244 |
| 4,389,381 | 6/1983 | Dinovo | 423/637 |

*Primary Examiner*—Gregory A. Heller
*Attorney, Agent, or Firm*—William A. Mikesell; Cortlan R. Schupbach

[57] ABSTRACT

Limestone is calcined by being suspended in hot gas produced by combustion of a low-carbon fuel to produce a quicklime of high surface area, which in one embodiment is used for flue gas desulfurization.

4 Claims, No Drawings

METHOD FOR PRODUCING REACTIVE LIME AND REDUCING SULFUR DIOXIDE

SUMMARY OF THE INVENTION

Lime of high chemical reactivity and high surface area is prepared by calcining limestone in a reactor in which the stone is suspended in the combustion products from a fuel of low carbon content. The resulting lime is especially useful for desulfurizing flue gas.

BACKGROUND OF THE INVENTION

It is known to calcine limestone by passing it downwardly by gravity through heating stages of increasing temperature in direct contact with combustion products of a fuel such as natural gas, as shown for example in U.S. Pat. No. 3,796,791, issued Mar. 12, 1974 to Nielsen et al.

More recently, there has been disclosed a calcining process wherein the calcination heat is provided by combustion of hydrogen in direct contact with moist calcium hydroxide pellets and limestone fragments on a travelling grate; see U.S. Pat. No. 3,998,928, issued Dec. 21, 1976 to Stendel et al.

DESCRIPTION

We have discovered that the surface area and chemical reactivity of lime are improved significantly when the limestone is calcined in an entrained or a fluidized bed by direct contact with the gaseous product of burning a low-carbon fuel such as natural gas, methane, or hydrogen.

By low-carbon fuel, we mean a fuel having a carbon: hydrogen weight ratio of at most about 3.1:1.

According to one embodiment of the invention, a limestone-containing feed material is introduced into a generally vertically arranged calciner vessel. Fuel gas and combustion air are also fed into the lower end of the calciner, preferably by way of spargers which distribute the gases evenly throughout the cross-sectional area of the lower end of the calciner. This embodiment comprises a fluidized bed calciner. In order to increase residence time of the limestone, the bed can also contain larger suspended particles of inert material, such as for example 10–50 mesh TSS silica or alumina beads. According to a second embodiment, the suspension reactor comprises a transport reactor, i.e. the hot gas is at a somewhat greater velocity, such that it both suspends and transports the limestone through the reactor.

The solid limestone-containing feed to the calciner is finely divided, preferably of a size that at least about 90 weight percent passes a 48 mesh Tyler Standard Screen. The feed can comprise relatively pure limestone, or it can for example comprise a partially spent sorbent which contains sufficient limestone content to merit regeneration. Furthermore, by "limestone" we also include other forms of calcium carbonate as well as its magnesium-containing counterpart, dolomite.

Limestone is calcined by thermal decomposition to calcium oxide and carbon dioxide at a temperature greater than 700° C. The feed rates of limestone, fuel and oxygen-containing combustion gas such as air are proportioned to provide a temperature of solids discharged from the calciner of between about 700° and 1200° C. Time required to effect thermal calcination is dependent upon the particle size of the material and the temperature of the suspending gas.

The treatment of the calcined solids issuing from the calciner is dependent on the utilization for which they are intended. According to a preferred embodiment of our invention, the calcined lime is utilized as a reagent for desulfurizing boiler flue gas. In such instance, thermal efficiency dictates that the calciner be located near the boiler, such that hot lime direct from the calciner can be injected into the boiler combustion gases without the necessity of an intervening cooling and reheating. This direct injection ensures that the highly reactive calcine immediately contacts $SO_2$ molecules in the combustion gases without potential activity loss, resulting from the cooling and reheating.

When the reactive calcine of this invention is used for flue gas desulfurization, it is preferably injected at a point downstream of the firebox where the prevailing temperature is sufficiently low to avoid dead-burning, but upstream as far as is feasible so as to maximize contact time with the $SO_2$. A suitable flue gas temperature range for injection is about 850° to about 1200° C. The high reactivity of the calcine causes it to combine rapidly with the sulfur dioxide present, forming calcium sulfate in the oxidizing atmosphere present in the boiler flue gas. The sulfate reaction products are removed from the flue gas by such devices as a bag filter or electrostatic precipitator.

We have discovered that the use of a fuel containing a low carbon/hydrogen ratio, such as methane or natural gas, or containing no carbon, such as hydrogen gas, provides the reduced carbon dioxide partial pressure environment for direct thermal decomposition of calcium carbonate which, when combined with suspension of the particles in the gases, results in a lime product of increased surface area and thus improved reactivity and utilization.

Our invention will now be illustrated by reference to the following examples.

EXAMPLE I

A freshly pulverized limestone of size range 90 weight percent through 100 mesh T.S.S. is heated in an entrained flow calciner with methane combustion gas as the carrier gas. The air rate is 2.5 times the stoichiometric rate for complete methane combustion. The air is preheated to 150° C. The gas velocity of about 60 feet per second produces entrainment of the solids, in the gas. The residence time in the calciner is about one second. The calciner exit temperature is about 950° C. Solids leaving the calciner are quenched by rapid exposure to cool dry air, and the B.E.T. surface area of the solids is then measured to be about 30 $m^2$/gram.

EXAMPLE II

A freshly pulverized limestone of size range 90 weight percent through 100 mesh is calcined in a bed with 10–50 mesh inert alumina beads fluidized with hot gas from combustion of methane. The methane is burned with 3 times the stoichiometric amount of air, preheated to 150° C. The bed temperature is about 850° C. The entrained solids in the exit gas are determined to have a surface area of about 30 $m^2$/g.

EXAMPLE III

The experiment of Example I is repeated, except that the fuel gas comprises hydrogen, and the resulting B.E.T. surface area is about 50 $m^2$/gram.

EXAMPLE IV

As a basis for comparison, a sample of the same ground limestone as used in Example I is heated in a quiescent state under 15/85 $CO_2$/air at 950° C. After quenching, the B.E.T. surface area is determined to be about 5 $m^2$/gram.

EXAMPLE V

Samples of product from each of Examples I–IV are measured for reactivity to sulfur dioxide. Their reactivity is determined to be roughly proportional to the squares of their surface area. The samples of Examples I–III produced by this invention are significantly more reactive than that of Example IV.

Reasonable variation and modification are possible within the scope of the foregoing disclosure and the appended claims to our invention, the essence of which is that we have provided an improved method for reducing the sulfur dioxide content of flue gas by reaction with quicklime of increased activity, and for preparing such quicklime.

We claim:

1. The method of reducing the sulfur dioxide content of flue gas which comprises:
   (a) passing a finely divided limestone-containing solid to a suspension zone;
   (b) providing an oxygen-containing gas and a low-carbon fuel gas having a carbon to hydrogen weight ratio of at most 3.1:1 respectively to said suspension zone at a velocity sufficient to suspend the solids in said zone;
   (c) burning said fuel gas with said oxygen-containing gas to generate heat in said suspension zone;
   (d) withdrawing from said suspension zone solids having a temperature of at least about 700° C.;
   (e) transporting the withdrawn solids as a suspension in the hot combustion product gases of said burning;
   (f) injecting the thus-transported solids into the flue gas containing sulfur dioxide; and
   (g) separating from the resulting mixture of gases a solid containing calcium sulfite and calcium sulfate.

2. The method of preparing quicklime of high surface area which comprises:
   (a) passing a finely divided limestone-containing solid to a suspension zone;
   (b) providing an oxygen-containing gas and a low-carbon fuel gas having a carbon to hydrogen weight ratio of at most 3.1:1 respectively to said suspension zone at a velocity sufficient to suspend the solids in said zone;
   (c) burning said fuel gas with said oxygen-containing gas to generate heat in said suspension zone; and
   (d) withdrawing from said suspension zone solids at a temperature of at least about 700° C. and having a high surface area.

3. The method of claims 1 or 2 wherein said finely divided limestone-containing solid is of a particle size such that at least about 90 weight percent passes a 48 mesh TSS screen.

4. The method of claims 1 or 2 wherein said calcination is carried out in the presence of inert beads, wherein the inert beads are larger than the finely divided limestone containing solid in the suspension zone.

* * * * *